US011926285B2

United States Patent
Kishimoto et al.

(10) Patent No.: US 11,926,285 B2
(45) Date of Patent: Mar. 12, 2024

(54) REMOTE COMMUNICATION SYSTEM

(71) Applicant: ALPS ALPINE CO., LTD., Tokyo (JP)

(72) Inventors: Yoshihisa Kishimoto, Miyagi (JP);
Keigo Wakana, Miyagi (JP); Daisuke Takai, Miyagi (JP); Yukimitsu Yamada, Miyagi (JP); Mitsuharu Nakasato, Miyagi (JP); Kazuma Sato, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 391 days.

(21) Appl. No.: 17/443,534

(22) Filed: Jul. 27, 2021

(65) Prior Publication Data
US 2021/0354662 A1 Nov. 18, 2021

Related U.S. Application Data

(63) Continuation of application No. PCT/JP2019/048268, filed on Dec. 10, 2019.

(30) Foreign Application Priority Data

Feb. 5, 2019 (JP) .................................. 2019-019145

(51) Int. Cl.
*B60R 25/24* (2013.01)
*G01S 5/02* (2010.01)
(Continued)

(52) U.S. Cl.
CPC .............. *B60R 25/245* (2013.01); *G01S 5/02* (2013.01); *G01S 11/04* (2013.01); *G01S 11/06* (2013.01);
(Continued)

(58) Field of Classification Search
CPC ... B60R 25/245; B60R 2325/205; G01S 5/02; G01S 11/04; G01S 11/06; G01S 5/01;
(Continued)

(56) References Cited

U.S. PATENT DOCUMENTS

| | | | |
|---|---|---|---|
| 10,857,976 B2 | 12/2020 | Kusumoto et al. | |
| 10,967,835 B2 | 4/2021 | Woo et al. | |
| 2006/0017626 A1* | 1/2006 | Kannan | H01Q 1/44 343/702 |
| 2014/0308971 A1 | 10/2014 | Obrien et al. | |
| 2019/0263358 A1* | 8/2019 | Kusumoto | G01S 13/003 |
| 2019/0366978 A1* | 12/2019 | Woo | B60R 25/245 |

FOREIGN PATENT DOCUMENTS

| | | |
|---|---|---|
| JP | 5555347 | 7/2014 |
| JP | 2016-015724 | 1/2016 |

(Continued)

OTHER PUBLICATIONS

International Search Report for PCT/JP2019/048268 dated Mar. 17, 2020.

*Primary Examiner* — Muhammad Shafi
(74) *Attorney, Agent, or Firm* — IPUSA, PLLC

(57) ABSTRACT

A remote communication system includes a portable device; and a fixed system. The fixed system includes main communication modules; and a position estimating unit configured to estimate a position of the portable device, based on an incident angle of a signal from the portable device, upon detecting the signal by antennas provided in the main communication modules. When there are two main communication modules for which the incident angle is known, the position of the portable device is estimated based on the incident angle. When there is one main communication module for which the incident angle is known, the position of the portable device is estimated based on the incident angle and a received radio wave intensity of the signal. When there is no main communication module for which the incident angle is known, the position of the portable device is estimated based on the received radio wave intensity.

7 Claims, 6 Drawing Sheets

(51) Int. Cl.
*G01S 11/04* (2006.01)
*G01S 11/06* (2006.01)
*B60W 30/06* (2006.01)

(52) U.S. Cl.
CPC ........ *B60R 2325/205* (2013.01); *B60W 30/06* (2013.01)

(58) Field of Classification Search
CPC .. G01S 5/0268; G01S 5/02213; G01S 5/0284; B60W 30/06; G07C 2009/00769; G07C 9/00309; G07C 2209/63; E05B 49/00
USPC .......................................................... 701/2
See application file for complete search history.

(56) References Cited

FOREIGN PATENT DOCUMENTS

| | | | |
|---|---|---|---|
| JP | 2016-038320 | | 3/2016 |
| JP | 2018-178506 | | 11/2018 |
| JP | 2018-199971 | | 12/2018 |
| JP | 2018-199971 | * | 12/2021 |
| WO | 2013/084030 | | 6/2013 |
| WO | 2018/093060 | | 5/2018 |
| WO | WO-2018-093060 | * | 5/2018 |
| WO | 2018/105225 | | 6/2018 |
| WO | WO-2018-105225 | * | 6/2018 |

* cited by examiner

REMOTE COMMUNICATION SYSTEM

CROSS-REFERENCE TO RELATED APPLICATION

The present application is a continuation application of International Application No. PCT/JP2019/048268 filed on Dec. 10, 2019, which is based on and claims priority to Japanese Patent Application No. 2019-019145 filed on Feb. 5, 2019. The contents of these applications are incorporated herein by reference in their entirety.

BACKGROUND OF THE INVENTION

1. Field of the Invention

The present invention relates to a remote communication system.

2. Description of the Related Art

Conventionally, a remote communication system has been known, in which an authentication ID is transmitted to an on-vehicle device from an electronic key possessed by a user, and the authentication ID is authenticated in the on-vehicle device so that various devices provided in the vehicle (e.g., a door lock, an engine starter, an automatic parking system, or the like) can be remotely operated from a portable device.

Relating to such a remote communication system, for example, Patent Document 1 discloses a technique in a smart entry system including an electronic key and an on-vehicle device. This technique is for estimating the direction of the electronic key based on a radio wave received from the electronic key, with respect to each of a plurality of receiving antennas, and estimating the position of the electronic key based on the direction of the electronic key estimated with respect to each antenna.

[Patent Document 1] Japanese Laid-open Patent Publication No. 2016-38320

SUMMARY OF THE INVENTION

According to one aspect of the present invention, there is provided a remote communication system including a portable device; and a fixed system, wherein the fixed system includes a plurality of main communication modules; and a position estimating unit configured to estimate a position of the portable device, based on an incident angle of a signal transmitted from the portable device, upon determining that the signal is detected by two or more antennas provided in the plurality of main communication modules, the incident angle being relative to each of the two or more antennas and calculated based on information measured by the two or more antennas, wherein when there are two or more main communication modules, among the plurality of main communication modules, that are in a state in which the incident angle of the signal transmitted from the portable device is known, the position estimating unit estimates the position of the portable device based on the incident angle of each of the signals transmitted from the portable device, at the two or more main communication modules and in a portable device presence area corresponding to a region that meets a condition that the two or more main communication modules are present, when there is one main communication module, among the plurality of main communication modules, that is in a state in which the incident angle of the signal transmitted from the portable device is known, the position estimating unit estimates the position of the portable device based on the incident angle of the signal transmitted from the portable device and a received radio wave intensity of the signal transmitted from the portable device, at the one main communication module and in a portable device presence area corresponding to a region that meets a condition that the one main communication module is present, and when there is no main communication module, among the plurality of main communication modules, that is in a state in which the incident angle of the signal transmitted from the portable device is known, the position estimating unit estimates the position of the portable device based on a received radio wave intensity of the signal transmitted from the portable device, in a portable device presence area corresponding to a region that meets a condition that none of the plurality of main communication modules are present, and wherein the signal transmitted from the portable device simultaneously delivers a signal for delivering necessary information to surroundings of the portable device and a signal for communicating with one or more communication modules, and the information measured by the two or more antennas includes phase information, signal intensity information, and time information.

DETAILED DESCRIPTION OF THE PREFERRED EMBODIMENTS

In the technique of Patent Document 1, each of the plurality of receiving antennas has directivity. Therefore, a region, which is outside the communication areas of the plurality of receiving antennas, may be formed. When the electronic key is present in such a region, none of the plurality of receiving antennas can receive radio waves from the electronic key, and thus the position of the portable device cannot be estimated.

Hereinafter, an embodiment will be described with reference to the drawings.

(System Configuration of Remote Communication System 10)

Figure 1:
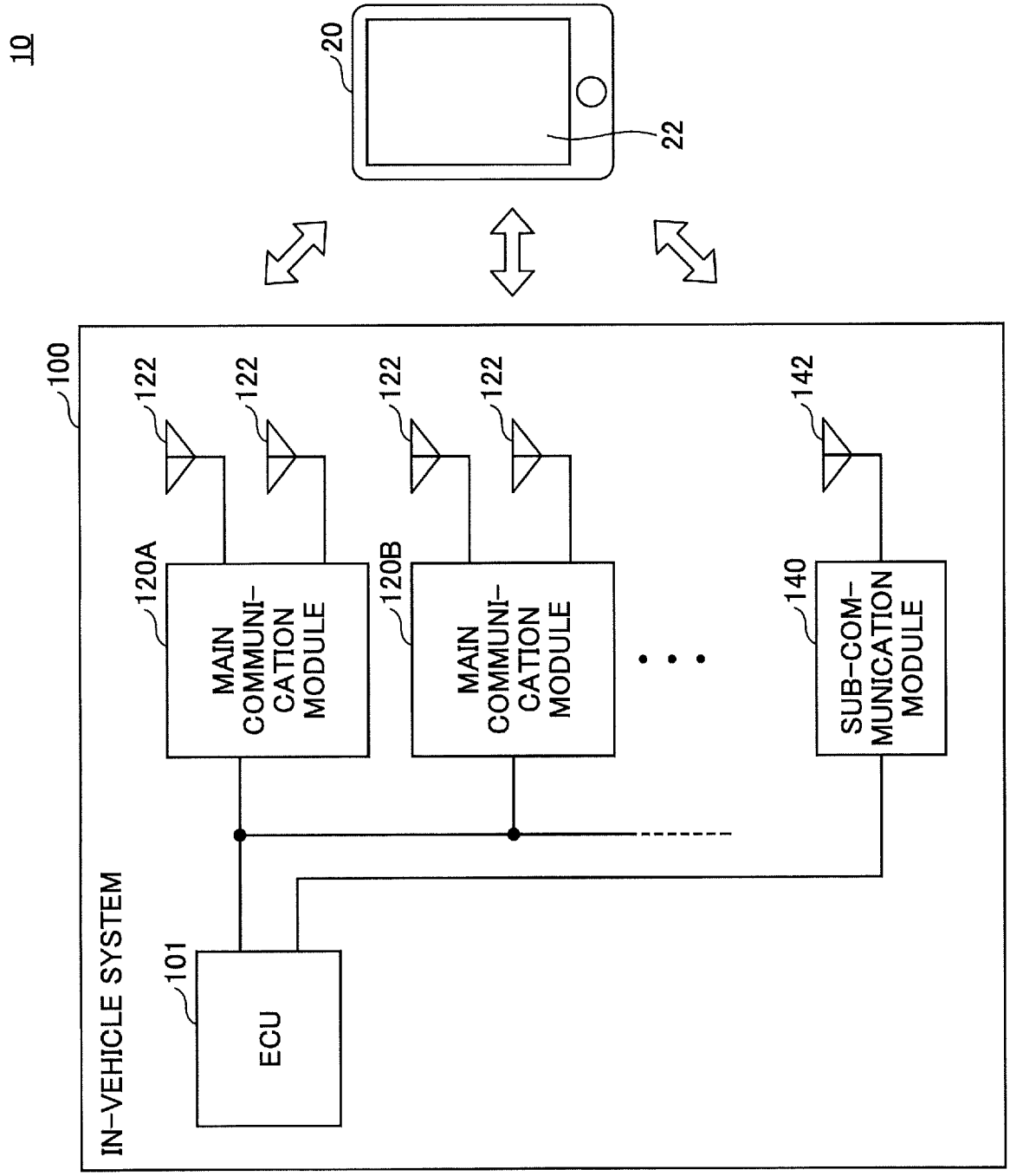
FIG. 1 is a diagram illustrating a system configuration of a remote communication system according to an embodiment.

FIG. 1 is a diagram illustrating a system configuration of a remote communication system 10 according to an embodiment. The remote communication system 10 illustrated in FIG. 1 includes an in-vehicle system 100 (an example of a "fixed system") and a smartphone 20.

The in-vehicle system 100 is mounted in a vehicle 30 and performs BLE (Bluetooth (registered trademark) Low Energy) wireless communication with the smartphone 20, thereby receiving a remote operation signal from the smartphone 20 and controlling various in-vehicle apparatuses (e.g., a door lock, an engine starter, an automatic parking system or the like) mounted in the vehicle, according to the remote operation signal.

As illustrated in FIG. 1, the in-vehicle system 100 includes an ECU (Electronic Control Unit) 101, a plurality of main communication modules 120, and a sub-communication module 140.

The ECU 101 controls the entire in-vehicle system 100 and executes various processes (for example, an authentication process for the smartphone 20, a control process for an in-vehicle apparatus according to a remote operation signal from the smartphone 20, and the like) in the in-vehicle system 100.

The main communication module 120 is an example of a "communication means". The main communication module 120 includes two directional antennas 122. The main communication module 120 is capable of BLE wireless communication by each of the directional antennas 122. The main communication module 120 performs BLE wireless communication with the smartphone 20 using the 2.4 GHz band, which is the frequency band corresponding to the BLE module provided in the smartphone 20. The main communication module 120 performs, in relation to the BLE wireless communication with the smartphone 20, communication connection, signal transmission and reception, various signal processes (for example, amplification processes, encoding and decoding processes, A-D/D-A conversion processes, modulation and demodulation processes, filter processes, and the like).

The main communication module 120 can output reception status information relating to the directional antenna 122. The reception status information is information concerning the reception status of a signal transmitted from the smartphone 20. The reception status information output from the main communication module 120 includes the RSSI (Received Signal Strength Indicator) value (an example of "received radio wave intensity") when a signal transmitted from the smartphone 20 is received at the directional antenna 122, and an incident angle θ of a signal, which is transmitted from the smartphone 20, relative to the directional antenna 122, when the signal transmitted from the smartphone 20 is received at the directional antenna 122. The main communication module 120 continuously outputs the reception status information at predetermined time intervals (e.g., intervals of several seconds). The main communication module 120 calculates the incident angle θ based on the information measured by the directional antenna 122 when a signal transmitted from the smartphone 20 is detected. The information measured by the directional antenna 122 is configured by phase information, signal intensity information, and time information.

Note that the main communication module 120 can calculate the incident angle θ, for example, by using the following formula (1). In the formula (1), d represents the distance between the two main communication modules 120. Further, Δφ represents the phase difference of the radio wave. Further, λ represents the wavelength of the radio wave.

[Formula 1]

$$\theta = \mathrm{Sin}^{-1}\left(\frac{1}{d}\frac{\Delta\varphi}{360}\lambda\right) \quad (1)$$

Figure 2:
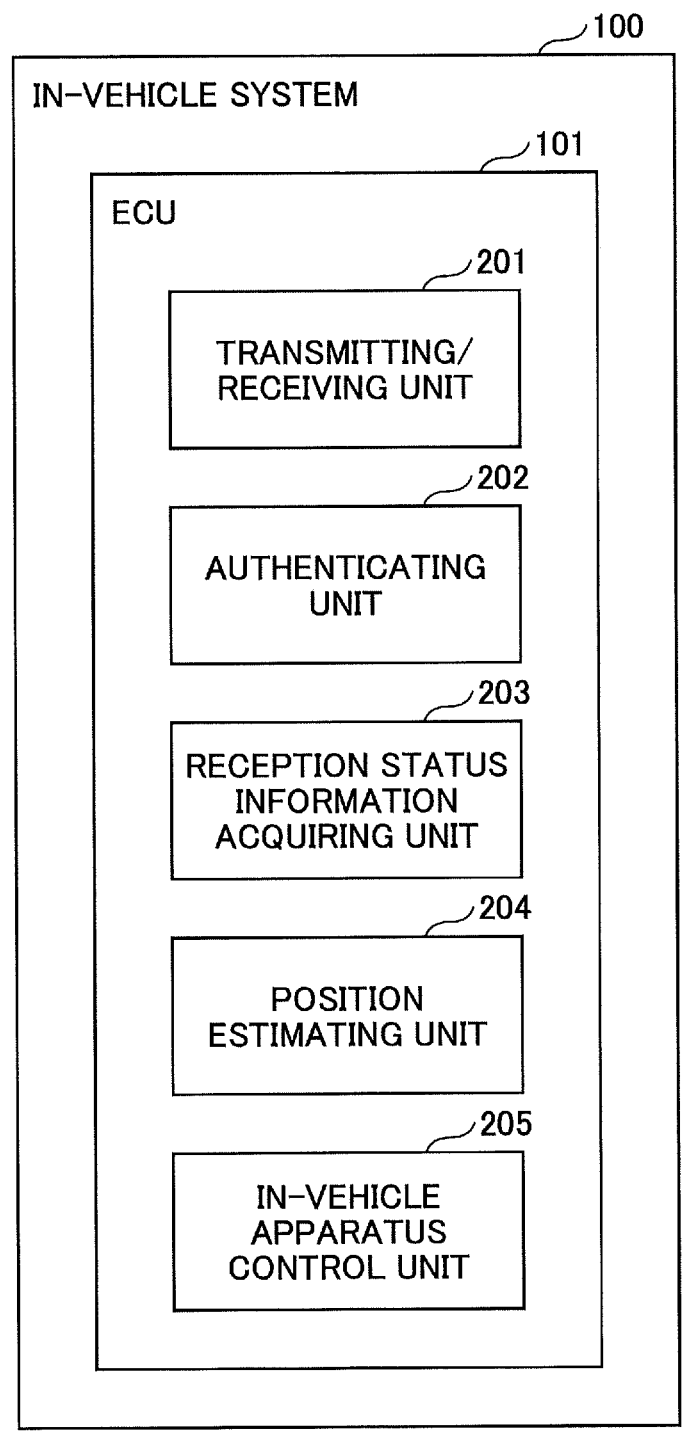
FIG. 2 is a block diagram illustrating the functional configuration of an in-vehicle system according to an embodiment.

Although FIG. 2 illustrates two main communication modules 120 (main communication modules 120A and 120B), the in-vehicle system 100 may include three or more main communication modules 120.

The sub-communication module 140 is another example of a "communication means". The sub-communication module 140 includes an omnidirectional antenna 142. The sub-communication module 140 can perform BLE wireless communication by the omnidirectional antenna 142. The sub-communication module 140 performs BLE wireless communication with the smartphone 20 using the 2.4 GHz band, which is the frequency band corresponding to the BLE module provided in the smartphone 20. The sub-communication module 140 performs, in relation to the BLE wireless communication with the smartphone 20, communication connection, signal transmission and reception, and various signal processes (for example, amplification processes, encoding and decoding processes, A-D/D-A conversion processes, modulation and demodulation processes, filter processes, and the like).

The sub-communication module 140 can output reception status information relating to the omnidirectional antenna 142. The reception status information output from the sub-communication module 140 includes an RSSI value when a signal transmitted from the smartphone 20 is received at the omnidirectional antenna 142. The sub-communication module 140 continuously outputs the reception status information at predetermined time intervals (e.g., intervals of several seconds).

The smartphone 20 is an example of a "portable device". The smartphone 20 is a device carried by a user, and is capable of remotely operating various in-vehicle apparatuses of the vehicle 30 according to instructions by the user. The smartphone 20 includes a communication module and a communication antenna that are compatible with BLE wireless communication using the 2.4 GHz frequency band, and is thus capable of BLE wireless communications with the in-vehicle system 100. The smartphone 20 can transmit, to the in-vehicle system 100, an authentication request signal for requesting authentication of the smartphone 20, a remote operation signal for remotely operating the in-vehicle apparatus, or the like, through BLE wireless communication with the in-vehicle system 100. The smartphone 20 can simultaneously deliver a signal for delivering necessary information to the surroundings of the smartphone 20 and a signal for communicating with one or more communication modules. Further, the smartphone 20 has an application installed for remotely operating the in-vehicle apparatus, and the application can display an operation screen for remotely operating the in-vehicle apparatus, on a touch panel display 22 provided on the smartphone 20, or can accept, by the touch panel display 22, a remote operation performed by a user.

(Functional Configuration of In-Vehicle System 100)

FIG. 2 is a block diagram illustrating a functional configuration of the in-vehicle system 100 according to an embodiment. As illustrated in FIG. 2, the ECU 101 of the in-vehicle system 100 includes a transmitting/receiving unit 201, an authenticating unit 202, a reception status information acquiring unit 203, a position estimating unit 204, and an in-vehicle apparatus control unit 205.

The transmitting/receiving unit 201 transmits and receives various signals to and from the smartphone 20 through each of the main communication modules 120 and the sub-communication module 140. For example, when the smartphone 20 enters the communication area and an authentication request signal is transmitted from the smartphone 20, the transmitting/receiving unit 201 receives the authentication request signal through the communication module (any of the main communication modules 120 and the sub-communication module 140) corresponding to the communication area. For example, when a remote operation is performed at the smartphone 20 and a remote operation signal is transmitted from the smartphone 20, the transmitting/receiving unit 201 receives the remote operation signal through the communication module (any of the main communication modules 120 and the sub-communication module 140) that is performing BLE communication connection with the smartphone 20.

The authenticating unit 202 performs an authentication process for the smartphone 20 according to the authentication request signal received by the transmitting/receiving unit 201. For example, when the authentication request signal is received by the transmitting/receiving unit 201, the authenticating unit 202 determines whether to authenticate the smartphone 20 depending on whether the authentication ID included in the authentication request signal has been previously registered. For example, when the authentication ID has previously been registered, the authenticating unit 202 authenticates the smartphone 20. Conversely, when the authentication ID has not been previously registered, the authenticating unit 202 does not authenticate the smartphone 20. The smartphone 20 authenticated by the authenticating unit 202 becomes capable of performing BLE communication connection with the communication module (any of the main communication modules 120 and the sub-communication module 140) corresponding to the communication area where the smartphone 20 has entered.

The reception status information acquiring unit 203 acquires the reception status information from each of the main communication modules 120 and the sub-communication module 140. The reception status information acquired from the main communication module 120 includes an RSSI value and the incident angle $\theta$ at the directional antenna 122. The reception status information obtained from the sub-communication module 140 includes an RSSI value at the omnidirectional antenna 142. The reception status information acquiring unit 203 continuously acquires the reception status information from each of the main communication modules 120 and the sub-communication module 140 at predetermined time intervals (for example, intervals of several seconds) according to the continuous output of the reception status information from each of the main communication modules 120 and the sub-communication module 140 at predetermined time intervals (for example, intervals of several seconds). Accordingly, the reception status information acquiring unit 203 can acquire the reception status information representing the latest reception status of the directional antenna 122 and the omnidirectional antenna 142.

The position estimating unit 204 estimates the position of the smartphone based on the reception status information acquired by the reception status information acquiring unit 203.

Specifically, the position estimating unit 204 determines whether there are two or more main communication modules 120 that are in a state in which the incident angle $\theta$ of the signal transmitted from the smartphone 20 is known, based on the reception status information acquired from each of the main communication modules 120. Here, the position estimating unit 204 determines the main communication module 120 having an RSSI value, indicated in the reception status information, that is greater than or equal to a predetermined threshold value th1, as the main communication module 120 that is in a state in which the incident angle $\theta$ of the signal transmitted from the smartphone 20 is known. Conversely, the position estimating unit 204 determines the main communication module 120 having an RSSI value, indicated in the reception state information, that is less than the predetermined threshold value th1, as the main communication module 120 that is not in a state in which the incident angle $\theta$ of the signal transmitted from the smartphone 20 is known. The predetermined threshold value th1 is a suitable value that is obtained in advance by simulation or the like, and is stored in a memory provided in the ECU 101.

When it is determined that there are two or more main communication modules 120 that are in a state in which the incident angle $\theta$ of the signal transmitted from the smartphone 20 is known, the position estimating unit 204 estimates the position of the smartphone 20 based on the incident angle $\theta$ at each of at least two of the two or more main communication modules 120 that are determined to be in a state in which the incident angle $\theta$ of the signal transmitted from the smartphone 20 is known. Here, the position of each main communication module 120 is already known, and, therefore, the position estimating unit 204 can estimate the position of the smartphone 20 by a triangulation method based on the position of each main communication module 120 and the incident angle $\theta$ at each main communication module 120.

When it is determined that there is one main communication module 120 that is in a state in which the incident angle $\theta$ of the signal transmitted from the smartphone 20 is known, the position estimating unit 204 estimates the position of the smartphone 20 based on the RSSI value and the incident angle $\theta$ at the one main communication module 120 determined to be in a state in which the incident angle $\theta$ of the signal transmitted from the smartphone 20 is known. Here, the position of the main communication module 120 is already known, and, therefore, the position estimating unit 204 can estimate the position of the smartphone 20 based on the position of the main communication module 120, the incident angle $\theta$ at the main communication module 120, and the estimated distance between the main communication module 120 and the smartphone 20 obtained by the RSSI value of the main communication module 120.

Conversely, when it is determined that there is no main communication module 120 that is in a state in which the incident angle $\theta$ of the signal transmitted from the smartphone 20 is known, the position estimating unit 204 estimates the position of the smartphone 20 based on the RSSI value of the omnidirectional antenna 142 acquired from the sub-communication module 140. Here, the position of the omnidirectional antenna 142 is already known, and, therefore, the position estimating unit 204 can estimate the approximate position of the smartphone 20 based on the position of the omnidirectional antenna 142 and the estimated distance between omnidirectional antenna 142 and the smartphone 20 obtained by the RSSI value of the omnidirectional antenna 142.

The in-vehicle apparatus control unit 205 controls an in-vehicle apparatus (for example, a door lock, an engine starter, an automatic parking system, or the like) that is the target of the remote operation, according to a remote operation signal (that is, a remote operation signal received by the transmitting/receiving unit 201) transmitted from the smartphone 20. For example, when the door lock is the in-vehicle apparatus that is the target of the remote operation, the in-vehicle apparatus control unit 205 transmits an unlock signal or a lock signal to a controller controlling the door lock. For example, when an automatic parking system is the in-vehicle apparatus that is the target of the remote operation, the in-vehicle apparatus control unit 205 continues to transmit a control signal to the automatic parking system so that the vehicle operates while the smartphone 20 continues to transmit an operation signal.

The in-vehicle apparatus control unit 205 controls the in-vehicle apparatus according to the position of the smartphone 20 estimated by the position estimating unit 204, as necessary. For example, when the position of the smartphone 20 is within a predetermined distance range from the vehicle 30, the in-vehicle apparatus control unit 205 controls the in-vehicle apparatus according to the remote operation signal. Conversely, when the position of the smartphone 20 is outside the predetermined distance range from the vehicle 30, the in-vehicle apparatus control unit 205 does not control the in-vehicle apparatus according to the remote operation signal.

For example, each of the functional units denoted by 201 to 205 described above is implemented in the ECU 101 by executing a program stored in a storage medium (e.g., a ROM (Read Only Memory), a RAM (Random Access Memory), an SSD (Solid State Drive), and the like) by a processor (e.g., CPU (Central Processing Unit), and the like). At least one of the functional units denoted by 201 to 205 described above may be implemented by another apparatus (an apparatus other than the ECU 101) provided in the in-vehicle system 100.

(Procedure of Process by In-Vehicle System 100)

Figure 3:
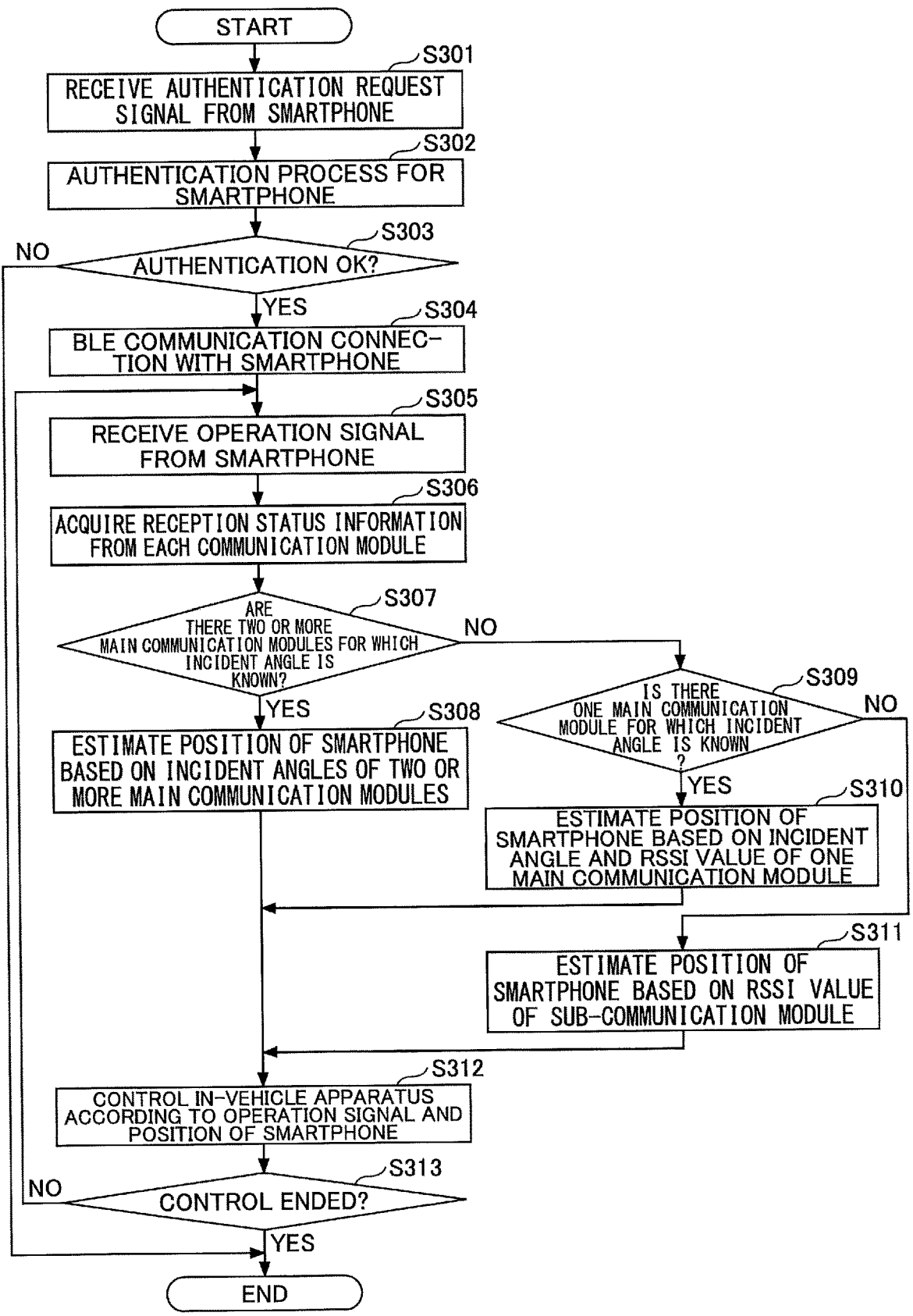
FIG. 3 is a flow chart illustrating a processing procedure by the in-vehicle system according to an embodiment.

FIG. 3 is a flowchart illustrating a procedure of a process by the in-vehicle system 100 according to an embodiment.

First, when the smartphone 20 enters the communication area of at least one of the main communication modules 120 and the sub-communication module 140 and transmits an authentication request signal from the smartphone 20, the transmitting/receiving unit 201 receives the authentication request signal through a communication module (one of the main communication modules 120 and the sub-communication module 140) corresponding to the communication area (step S301).

Next, the authenticating unit 202 performs an authentication process for the smartphone 20 according to the authentication request signal received in step S301 (step S302). In the authentication process of step S302, when the smartphone 20 is not authenticated (step S303: NO), the in-vehicle system 100 ends the series of processes illustrated in FIG. 3.

Conversely, in the authentication process of step S302, when the smartphone 20 is authenticated (step S303: YES), the in-vehicle system 100 performs BLE communication connection with the smartphone 20 through the communication module (any one of the main communication modules 120 and the sub-communication module 140) corresponding to the communication area in which the smartphone 20 has entered (step S304).

Subsequently, when the transmitting/receiving unit 201 receives a remote operation signal from the smartphone 20 (step S305), the reception status information acquiring unit 203 acquires, from each of the main communication modules 120 and the sub-communication module 140, the reception status information regarding the reception status of the signal transmitted from the smartphone 20 (step S306).

The position estimating unit 204 determines whether there are two or more main communication modules 120 that are in a state in which the incident angle θ of the signal transmitted from the smartphone 20 is known, based on the reception status information received in step S306 (step S307).

In step S307, when it is determined that "there are two or more main communication modules 120 in a state in which the incident angle θ of the signal transmitted from the smartphone 20 is known" (YES in step S307), the position estimating unit 204 estimates the position of the smartphone 20 based on the incident angle θ (i.e., the incident angle θ relative to the directional antenna 122) at each of the at least two main communication modules 120 determined to be in a state in which the incident angle θ of the signal is known (step S308). Then, the in-vehicle system 100 proceeds with the process to step S312.

Conversely, in step S307, when it is determined that "two or more main communication modules 120 in a state in which the incident angle θ of the signal transmitted from the smartphone 20 is known, are not present" (step S307: NO), the position estimating unit 204 determines whether there is one main communication module 120 in a state in which the incident angle θ of the signal transmitted from the smartphone 20 is known, based on the reception status information received in step S306 (step S309).

In step S309, when it is determined that "there is one main communication module 120 in a state in which the incident angle θ of the signal transmitted from the smartphone 20 is known" (step S309: YES), the position estimating unit 204 estimates the position of the smartphone 20 based on the RSSI value and the incident angle θ at one of the main communication modules 120 determined to be in a state in which the incident angle θ of the signal is known (step S310). Then, the in-vehicle system 100 proceeds with the process to step S312.

Conversely, in step S309, when it is determined that "one main communication module 120 in a state in which the incident angle θ of the signal transmitted from the smartphone 20 is known, is not present" (step S309: NO), the position estimating unit 204 estimates the position of the smartphone 20 based on the RSSI value of the omnidirectional antenna 142 of the sub-communication module 140 (step S311). Then, the in-vehicle system 100 proceeds with the process to step S312.

In step S312, the in-vehicle apparatus control unit 205 performs control of the in-vehicle apparatus according to the position of the smartphone 20 estimated in step S308, step S310, or step S311. For example, when the position of the smartphone 20 is within a predetermined distance range from the vehicle 30, the in-vehicle apparatus control unit 205 controls the in-vehicle apparatus according to the remote operation signal. Conversely, when the position of the smartphone 20 is outside the predetermined distance range from the vehicle 30, the in-vehicle apparatus control unit 205 does not control the in-vehicle apparatus according to the remote operation signal.

Subsequently, the in-vehicle apparatus control unit 205 determines whether the control of the in-vehicle apparatus has ended (step S313). In step S313, when it is determined that "control of the in-vehicle unit has not ended" (step S313: NO), the in-vehicle system 100 returns the process to step S305. Conversely, in step S313, when it is determined that "control of the in-vehicle unit has ended" (step S313: YES), the in-vehicle system 100 ends the series of processes illustrated in FIG. 3.

For example, when the operation of the in-vehicle apparatus that is the target of remote operation can be completed by a single operation, such as in the case of a door lock, the in-vehicle system 100 executes steps S305 to S312 only once. On the other hand, when the operation of the in-vehicle apparatus that is the target of remote operation is completed by multiple operations, such as in the case of an automatic parking system, the in-vehicle system 100 repeatedly executes steps S305 to S312 until the remote operations with respect to the in-vehicle apparatus is ended.

(Example of a Communicable Area of the In-Vehicle System 100)

Figure 4:
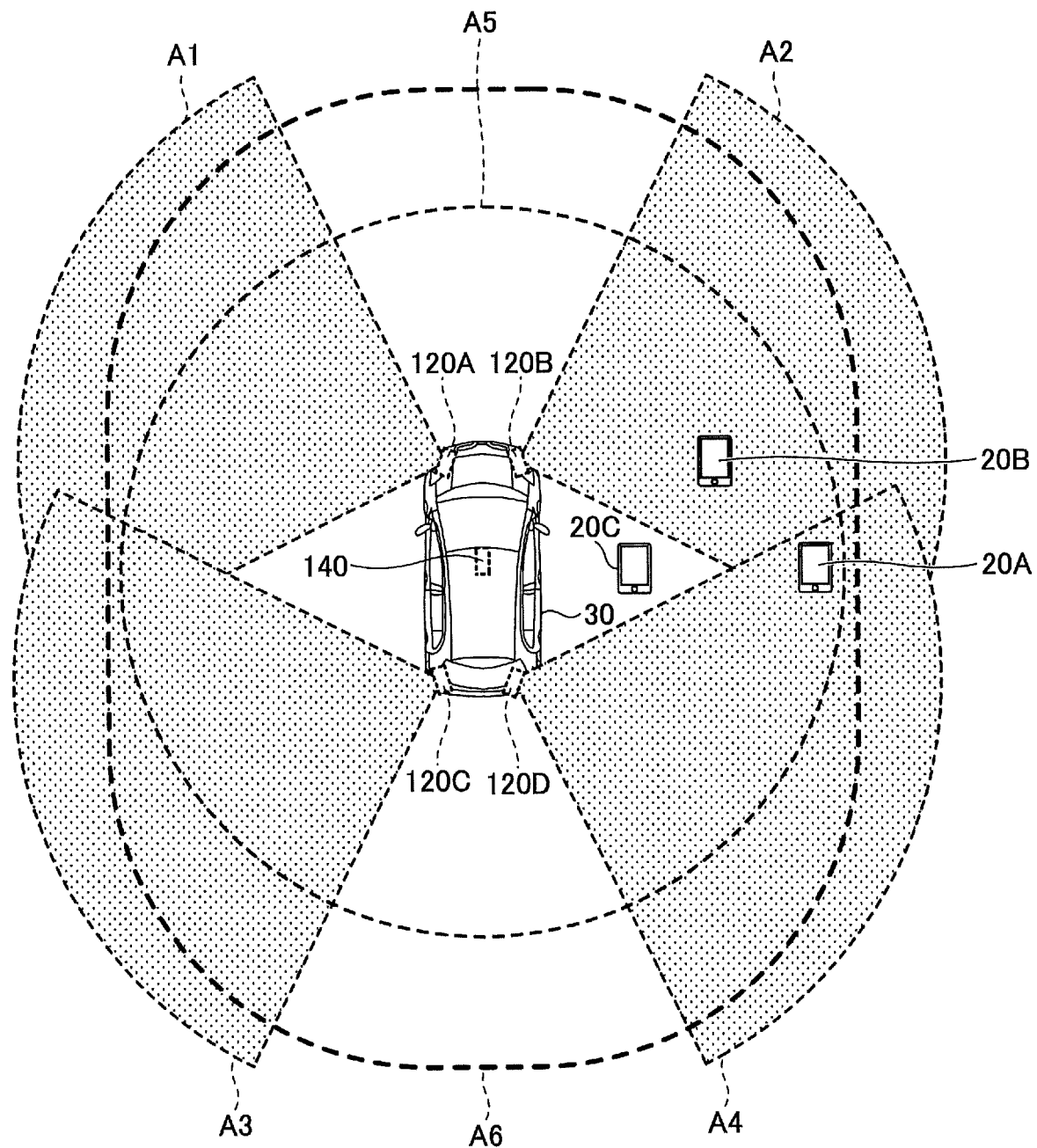
FIG. 4 is a diagram illustrating an example of a communication area of the in-vehicle system according to an embodiment.

FIG. 4 is a diagram illustrating examples of communication areas of the in-vehicle system 100 according to an embodiment. In the example illustrated in FIG. 4, the in-vehicle system 100 includes four main communication modules 120 (main communication modules 120A, 120B, 120C, and 120D) provided in the vehicle 30 and the sub-communication module 140 provided in the vehicle 30.

The main communication module 120A is located at the left front corner portion of the vehicle 30. The main communication module 120A forms a fan-shaped communication area A1 expanding in the left front of the vehicle 30 by the directional antenna 122 provided in the main communication module 120A.

The main communication module 120B is located at the right front corner portion of the vehicle 30. The main communication module 120B forms a fan-shaped communication area A2 expanding to the right front of the vehicle 30 by the directional antenna 122 provided in the main communication module 120B.

The main communication module 120C is located at the left rear corner portion of the vehicle 30. The main communication module 120C forms a fan-shaped communication area A3 expanding to the left rear of the vehicle 30 by the directional antenna 122 provided in the main communication module 120C.

The main communication module 120D is located at the right rear corner portion of the vehicle 30. The main communication module 120D forms a fan-shaped communication area A4 expanding to the right rear of the vehicle 30 by the directional antenna 122 provided in the main communication module 120D.

The sub-communication module 140 is located at the center of the vehicle 30. The sub-communication module 140 forms a circular communication area A5 centered on the sub-communication module 140 by the omnidirectional antenna 142 provided in the sub-communication module 140.

A distance range A6 illustrated in FIG. 4 represents a predetermined distance range (for example, 6 m) from the vehicle 30 and represents a distance range allowing remote operations with respect to the vehicle 30. That is, when the smartphone 20 is present in the distance range A6, it is preferable that the smartphone 20 is capable of remotely operating the in-vehicle apparatus, and when the smartphone 20 is present outside the distance range A6, it is preferable that the smartphone 20 is not capable of remotely operating the in-vehicle apparatus. For example, in the example illustrated in FIG. 4, three smartphones 20A, 20B, and 20C are present in the distance range A6. In this case, it is preferable that any of the three smartphones 20A, 20B, and 20C can remotely operate the in-vehicle apparatus.

The smartphone 20A is present in a region where the communication area A2 of the main communication module 120B and the communication area A4 of the main communication module 120D overlap each other. That is, the in-vehicle system 100 can receive signals transmitted from the smartphone 20A by each of two of the main communication modules 120. In this case, the in-vehicle system 100 can estimate the position of the smartphone 20A based on the incident angle θ at each of the two main communication modules 120. As a result, the in-vehicle system 100 determines that the smartphone 20A is within a predetermined allowed area, and can thus allow remote operations with respect to the in-vehicle apparatus by the smartphone 20A.

The smartphone 20B is present in the communication area A2 of the main communication module 120B. That is, the in-vehicle system 100 can receive signals transmitted from the smartphone 20B by one main communication module 120 (the directional antenna 122 of the main communication module 120B). In this case, the in-vehicle system 100 can estimate the position of the smartphone 20B based on the RSSI value and incident angle θ at the one main communication module 120. As a result, the in-vehicle system 100 determines that the smartphone 20B is within a predetermined allowed area, and can thus allow remote operations with respect to the in-vehicle apparatus by the smartphone 20B.

The smartphone 20C is present outside the ranges of the communication areas A1 to A4. That is, the in-vehicle system 100 cannot receive a signal transmitted from the smartphone 20C by any of the main communication modules 120. However, the smartphone 20C is within the range of the communication area A5 of the sub-communication module 140. That is, the in-vehicle system 100 can receive signals transmitted from the smartphone 20C by the omnidirectional antenna 142 of the sub-communication module 140. In this case, the in-vehicle system 100 can estimate the position (distance from the vehicle 30) of the smartphone 20C based on the RSSI value of the omnidirectional antenna 142. As a result, the in-vehicle system 100 determines that the smartphone 20C is within a predetermined allowed area, and can thus allow remote operations with respect to the in-vehicle apparatus by the smartphone 20C.

(Example of Remote Communication System 10)

Figure 5A:
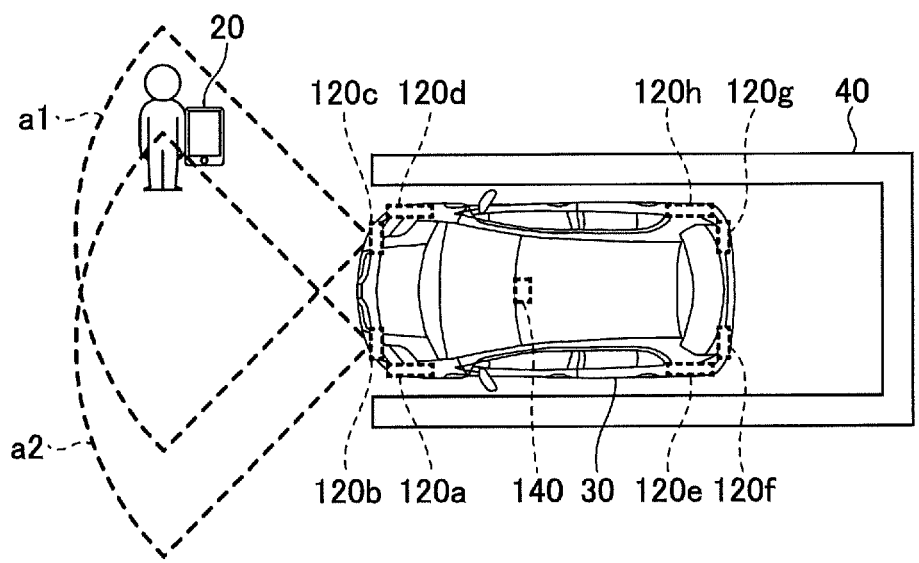
FIG. 5A is a diagram illustrating an example of the remote communication system according to an embodiment.
Figure 5B:
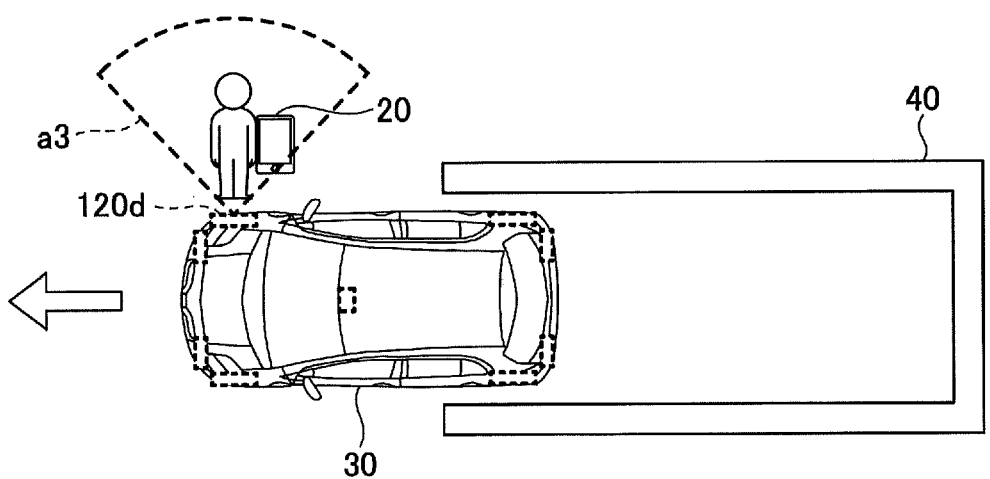
FIG. 5B is a diagram illustrating an example of the remote communication system according to an embodiment.
Figure 5C:
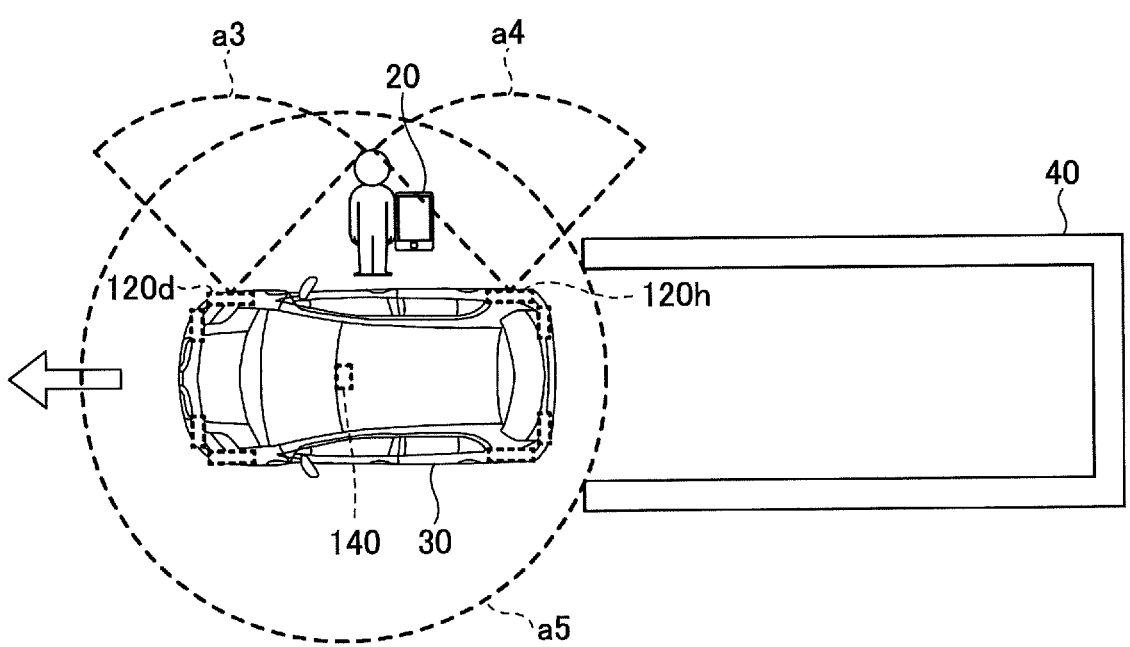
FIG. 5C is a diagram illustrating an example of the remote communication system according to an embodiment.

FIGS. 5A, 5B, and 5C are diagrams illustrating an example of the remote communication system 10 according to an embodiment. FIGS. 5A, 5B, and 5C illustrate an example in which the vehicle 30 is shipped from a garage 40 by remotely operating an automatic parking system mounted in the vehicle 30, from the smartphone 20 through the in-vehicle system 100.

In the example illustrated in FIGS. 5A, 5B, and 5C, the in-vehicle system 100 includes eight main communication modules 120 (main communication modules 120a, 120b, 120c, 120d, 120e, 120f, 120g, and 120h) provided in the vehicle 30, and the sub-communication module 140 provided in the vehicle 30. Each of the eight main communication modules 120 forms a fan-shaped communication area by the corresponding directional antenna 122.

In the example illustrated in FIG. 5A, the vehicle 30 is in a state of being stored in the garage. In FIG. 5A, the position of the smartphone 20 is at the right front of the vehicle 30, and is in a region where a communication area a1 of the main communication module 120c provided on the right portion of the front side of the vehicle 30 and a communication area a2 of the main communication module 120b provided on the left portion of the front side of the vehicle 30, are overlapping each other.

In this case, the in-vehicle system 100 can receive signals transmitted from the smartphone 20 by each of the two main communication modules 120 (the directional antennas 122 of the main communication modules 120b and 120c). The in-vehicle system 100 can then estimate the position of the smartphone 20 based on the incident angle θ at each of the two main communication modules 120. As a result, the in-vehicle system 100 can determine that the smartphone 20 is within a predetermined allowed area and can thus allow the remote operation of the automatic parking system by the smartphone 20. The in-vehicle system 100 can receive a remote operation signal from the smartphone 20 by either one of the main communication module 120b or the main communication module 120c, and control the automatic parking system according to the remote operation signal.

In the example illustrated in FIG. 5B, the position of the smartphone 20 is unchanged but the vehicle 30 has moved forward from the example illustrated in FIG. 5A. In FIG. 5B, the position of the smartphone 20 is beside the front portion of the right side of the vehicle 30, and is in a communication area a3 of the main communication module 120d provided on the front portion of the right side of the vehicle 30.

In this case, the in-vehicle system 100 can receive signals transmitted from the smartphone 20 by one main communication module 120 (the directional antenna 122 of the main communication module 120d). The in-vehicle system 100 can then estimate the position of the smartphone 20 based on the RSSI value and the incident angle θ at the one main communication module 120. As a result, the in-vehicle system 100 can determine that the smartphone 20 is within a predetermined allowed area and can thus allow remote operation of the automatic parking system by the smartphone 20. The in-vehicle system 100 can receive the remote operation signal from the smartphone 20 through the main communication module 120d and control the automatic parking system according to the remote operation signal.

In the example illustrated in FIG. 5C, the position of the smartphone 20 is unchanged but the vehicle 30 has moved forward from the example illustrated in FIG. 5B. In FIG. 5C, the position of the smartphone 20 is beside the center portion of the right side of the vehicle 30, and is in a region sandwiched between the communication area a3 of the main communication module 120d provided on the front portion of the right side of the vehicle 30 and a communication area a4 of the main communication module 120h provided on the rear portion of the right side of the vehicle 30. That is, the position of the smartphone 20 is not within the communication area of any of the eight main communication modules 120. However, the position of the smartphone 20 is within a communication area a5 of the sub-communication module 140.

In this case, the in-vehicle system 100 cannot receive signals transmitted from the smartphone 20 by any of the directional antennas 122 of the eight main communication modules 120. However, the in-vehicle system 100 can receive signals transmitted from the smartphone 20 by the omnidirectional antenna 142 of the sub-communication module 140. The in-vehicle system 100 can then estimate the position (distance from the vehicle 30) of the smartphone 20 based on the RSSI value of the omnidirectional antenna 142. As a result, the in-vehicle system 100 can determine that the smartphone 20 is within a predetermined allowed area, and can thus allow remote operation of the automatic parking system by the smartphone 20. The in-vehicle system 100 can then receive the remote operation signal from the smartphone 20 by the sub-communication module 140 and control the automatic parking system according to the remote operation signal.

As described above, even when the smartphone 20 enters a dead angle of the communication area of each of the eight main communication modules 120 as the vehicle 30 moves, the in-vehicle system 100 according to the present embodiment can continuously perform remote operation of the automatic parking system from the smartphone 20 by BLE communication with the omnidirectional antenna 142.

As described above, the remote communication system 10 according to an embodiment includes the smartphone 20 and the in-vehicle system 100. The in-vehicle system 100 includes a plurality of the main communication modules 120 and the position estimating unit 204 for estimating the position of the smartphone 20 based on the incident angle θ calculated based on information measured by two or more antennas when a signal transmitted from the smartphone 20 is detected by two or more antennas of a plurality of the main communication modules 120. When there are two or more main communication modules 120 in a state in which the incident angle θ of a signal transmitted from the smartphone 20 is known, the position estimating unit 204 estimates the position of the smartphone 20 based on the incident angle θ of each of the signals transmitted from the smartphone 20, at the two main communication modules 120. When there is one main communication module 120 in a state in which the incident angle θ of a signal transmitted from the smartphone 20 is known, the position estimating unit 204 estimates the position of the smartphone 20 based on the incident angle θ of the signal transmitted from the smartphone 20 and the RSSI value of the signal transmitted from the smartphone 20, at the one main communication module 120. When there is no main communication module 120 in a state in which the incident angle θ of a signal transmitted from the smartphone 20 is known, the position estimating unit 204 estimates the position of the smartphone 20 based on the RSSI value of the signal transmitted from the smartphone 20. The signal transmitted from the smartphone 20 is for simultaneously delivering a signal for delivering the necessary information to the surroundings of the smartphone 20 and a signal for communicating with the one or more communication modules. The information measured by the two or more antennas includes phase information, signal intensity information, and time information. Accordingly, the remote communication system 10 according to an embodiment can estimate the position of the smartphone 20 even when the smartphone 20 is present outside the communication areas of the plurality of main communication modules 120.

While embodiments of the invention have been described in detail above, the present invention is not limited to these embodiments, and various modifications or changes are possible within the scope of the present invention as defined in the appended claims.

For example, in the above-described embodiment, one omnidirectional antenna 142 is provided, but the present invention is not limited thereto; a plurality of omnidirectional antennas 142 may be provided.

In the above-described embodiment, two directional antennas 122 are provided for one main communication module 120, and one omnidirectional antenna 142 is provided for one sub-communication module 140, but the present invention is not limited thereto. For example, one or three or more directional antennas 122 may be provided for one main communication module 120. One or more directional antennas 122 and one or more omnidirectional antennas 142 may be provided for one communication module.

In the above-described embodiment, a smartphone is used as an example of a "portable device". However, for example, a device (e.g., an electronic key) exclusively used for the remote operation of an in-vehicle apparatus may be used as a "portable device".

According to an aspect of the present invention, the position of a portable device can be estimated even when the portable device is outside the communication areas of the plurality of directional antennas.

What is claimed is:

1. A remote communication system comprising:
a portable device; and
a fixed system, wherein
the fixed system includes:
   a plurality of main communication modules; and
   a position estimating unit configured to estimate a position of the portable device, based on an incident angle of a signal transmitted from the portable device, upon determining that the signal is detected by two or more antennas provided in the plurality of main communication modules, the incident angle being relative to each of the two or more antennas and calculated based on information measured by the two or more antennas, wherein
   when there are two or more main communication modules, among the plurality of main communication modules, that are in a state in which the incident angle of the signal transmitted from the portable device is known, the position estimating unit estimates the position of the portable device based on the incident angle of each of the signals transmitted from the portable device, at the two or more main communication modules and in a portable device presence area corresponding to a region that meets a condition that the two or more main communication modules are present,
   upon determining that there are not two or more main communication modules, among the plurality of main communication modules, that are in the state in which the incident angle of the signal transmitted from the portable device is known, when there is one main communication module, among the plurality of main communication modules, that is in the state in which the incident angle of the signal transmitted from the portable device is known, the position estimating unit estimates the position of the portable device based on the incident angle of the signal transmitted from the portable device and a received radio wave intensity of the signal transmitted from the portable device, at the one main communication module and in a portable device presence area corresponding to a region that meets a condition that the one main communication module is present, and
   upon determining that there is no main communication module, among the plurality of main communication modules, that is in the state in which the incident angle of the signal transmitted from the portable device is known, the position estimating unit estimates the position of the portable device based on a received radio wave intensity of the signal transmitted from the portable device, in a portable device presence area corresponding to a region that meets a condition that none of the plurality of main communication modules are present, and wherein
   the signal transmitted from the portable device simultaneously delivers a signal for delivering necessary information to surroundings of the portable device and a signal for communicating with one or more communication modules, and
   the information measured by the two or more antennas includes phase information, signal intensity information, and time information.

2. The remote communication system according to claim 1, wherein the position estimating unit determines that a main communication module, among the plurality of main communication modules, is in a state in which the incident angle of the signal transmitted from the portable device is known, upon determining that a received radio wave intensity of the signal transmitted from the portable device to the corresponding main communication module is greater than or equal to a predetermined threshold.

3. The remote communication system according to claim 1, wherein
   the fixed system further includes:
      an in-vehicle apparatus control unit configured to control an in-vehicle apparatus according to an operation signal transmitted from the portable device, and wherein
   the in-vehicle apparatus control unit controls the in-vehicle apparatus according to the operation signal upon determining that the position of the portable device estimated by the position estimating unit is within a predetermined distance range, and
   the in-vehicle apparatus control unit does not control the in-vehicle apparatus according to the operation signal upon determining that the position of the portable device estimated by the position estimating unit is outside the predetermined distance range.

4. The remote communication system according to claim 3, wherein the in-vehicle apparatus controlled by the in-vehicle apparatus control unit is a door lock.

5. The remote communication system according to claim 3, wherein the in-vehicle apparatus controlled by the in-vehicle apparatus control unit is an automatic parking system.

6. The remote communication system according to claim 1, wherein each of the plurality of main communication modules is provided in a vehicle in a manner that a part of a communication area of each of the plurality of main communication modules overlaps a communication area of another main communication module of the plurality of main communication modules.

7. The remote communication system according to claim 1, wherein each of the plurality of main communication modules is disposed at a corner portion of a vehicle.

* * * * *